United States Patent
Eickhoff

(10) Patent No.: US 9,272,655 B2
(45) Date of Patent: Mar. 1, 2016

(54) LATCH SYSTEM FOR TRUCK-BED MOUNTED CAMPER

(71) Applicant: Corae, Inc., Hartington, NE (US)

(72) Inventor: Robert A. Eickhoff, Jacksboro, TN (US)

(73) Assignee: Corae, Inc., Hartington, NE (US)

( * ) Notice: Subject to any disclaimer, the term of this patent is extended or adjusted under 35 U.S.C. 154(b) by 0 days.

(21) Appl. No.: 14/247,804

(22) Filed: Apr. 8, 2014

(65) Prior Publication Data

US 2015/0145279 A1    May 28, 2015

Related U.S. Application Data

(60) Provisional application No. 61/907,770, filed on Nov. 22, 2013.

(51) Int. Cl.
*B60R 15/00* (2006.01)
*B60P 3/34* (2006.01)
*B60P 3/36* (2006.01)
*B60P 3/32* (2006.01)

(52) U.S. Cl.
CPC .... *B60P 3/36* (2013.01); *B60P 3/32* (2013.01)

(58) Field of Classification Search
CPC ............ B60P 3/32; B60P 3/36; B60P 1/6418; B60P 3/341; B60P 3/42; B60P 7/08; B82Y 30/00; B82Y 40/00; B62D 25/06; B62D 29/043; B62D 33/0207; B62D 53/025; B62D 53/06; B62D 59/02; B62D 61/12; B62D 63/065
USPC .............. 296/167, 156, 165, 168, 26.05, 164; 414/462, 495, 498, 500, 538
See application file for complete search history.

(56) References Cited

U.S. PATENT DOCUMENTS

| | | | |
|---|---|---|---|
| 3,820,833 A | 6/1974 | Margetts | |
| 4,648,649 A | 3/1987 | Beal | |
| 5,203,364 A * | 4/1993 | Koole | 135/148 |
| 5,486,031 A * | 1/1996 | Ronchetti et al. | 296/10 |
| 5,692,794 A | 12/1997 | Kelsch et al. | |
| 5,833,302 A | 11/1998 | Kerr | |
| 6,698,810 B1 * | 3/2004 | Lane | 296/3 |
| 7,198,314 B1 * | 4/2007 | Edwards | 296/26.04 |
| 7,219,951 B2 | 5/2007 | Rasmussen | |
| 7,287,798 B2 * | 10/2007 | King | 296/57.1 |
| 7,322,637 B2 | 1/2008 | Smith | |
| 8,075,041 B2 * | 12/2011 | Diniz | 296/100.01 |
| 8,480,158 B2 | 7/2013 | McCarthy et al. | |
| 2006/0284146 A1 * | 12/2006 | Perham | 254/45 |

* cited by examiner

*Primary Examiner* — Glenn Dayoan
*Assistant Examiner* — Sunsurraye Westbrook
(74) *Attorney, Agent, or Firm* — Pitts & Lake, P.C.

(57) ABSTRACT

A latch system for securing a camper within the bed of a truck is provided. The latch system comprises two main assemblies: the bed-mounted rail-receiver track assembly and the camper rail frame assembly which is adapted to be secured to the bottom of the camper. The camper rail frame assembly includes at least a left camper rail and at least a right camper rail. The bed-mounted rail-receiver track assembly includes at least two and preferably four bed-mounted rail-receiver track members adapted for receiving the rail members carried by the bottom of the camper. Each bed-mounted rail-receiver track member preferably includes a flange flared so as to compensate for slight misalignments, either up or side to side, of the camper as the camper is being mounted within the bed of the truck.

20 Claims, 6 Drawing Sheets

LATCH SYSTEM FOR TRUCK-BED MOUNTED CAMPER

CROSS-REFERENCE TO RELATED APPLICATIONS

This application claims the benefit of U.S. Provisional Patent Application No. 61/907,770, filed on Nov. 22, 2013, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

This invention pertains to truck-bed mounted campers, sometimes referred to in the art as wheel-less campers. More particularly, this invention relates to a latch system for securing a camper in the bed of a truck in a manner that substantially eliminates the tendency of the camper to bounce within the bed of the truck during transport.

2. Description of the Related Art

Truck bed campers, bed-mounted shell tops, and truck mounted tent campers have long been known in the art. For instance, U.S. Pat. No. 3,820,833, issued to Margetts et al. on Jun. 28, 1974, discloses a geared system, including gear engageable racks mounted on the bottom of the camper for loading the camper into the bed of the truck and for locking the camper body against sliding off the truck bed after it has been loaded thereon. U.S. Pat. No. 4,648,649, issued to Beal, on Mar. 10, 1987, discloses a rail system having rail members mounted on the top surface of the truck bed walls and cooperating rail members secured to the underside of the camper shell. These cooperating rail members engage one another in dove tail fashion. U.S. Pat. No. 5,692,794, issued to Kelsch et al. on Dec. 2, 1997, discloses a combination pickup shell and carpet kit that can be loaded or unloaded in minutes by one person. U.S. Pat. No. 5,833,302, issued to Kerr on Nov. 10, 1998, discloses an apparatus for mounting a camper on the bed of a vehicle, in which the apparatus includes a pair of laterally spaced and generally opposed stabilizers for engaging the camper and aligning the camper with the bed of the truck. Further, U.S. Pat. No. 7,219,951, issued to Rasmussen on May 22, 2007, discloses a tie-down assembly for securing a truck camper to a truck. U.S. Pat. No. 7,322,637, issued to Smith on Jan. 29, 2008, discloses a vehicle cargo bed tent camper. And, U.S. Pat. No. 8,480,158, issued to McCarthy et al. on Jul. 9, 2013, discloses a wheel-less truck mounted camper having jack stands for supporting the camper and which are disposed within a sidewall of the camper. Typically, bed-mounted campers are secured to the truck-bed by tie-downs, such as the tie-downs disclosed in the '951 patent. However, these tie-downs can apply spreading forces to the frame of the camper that are undesirable.

What is missing from the art is a latch system having rails mounted on the bottom frame of the camper and that cooperate with rails which are removably secured to the bed of the truck, or a truck-like vehicle having a bed; and that are adapted to secure the camper in the bed of the vehicle so as to prevent the camper from bouncing within the bed during transport.

BRIEF SUMMARY OF THE INVENTION

According to one embodiment of the present invention, a latch system for a bed-mounted camper is provided. It will be appreciated by those skilled in the art, that typical bed-mounted campers incorporate a lower region adapted to be received within the confines of a truck bed and, thus, having a width adapted to be received within the width between the wheel wells; additionally, the truck bed camper has an upper region that is often wider than, and thus may overhang, and extends above the side walls of the truck bed. In order to secure the bed-mounted camper within the bed of the truck and prevent bouncing of the camper within the bed of the truck during transport, a latch system for a bed-mounted camper, of the present invention, is provided. The latch system comprises two main assemblies: the camper rail frame member which is adapted to be secured to the bottom of the camper, i.e. the portion that engages and is supported by the floor of the bed of the truck, and the bed-mounted rail-receiver track assembly.

The camper rail frame member includes a left camper rail and a right camper rail. While in an alternate embodiment the left camper rail and the right camper rail can each be adapted to have a length substantially equal to the length of the floor of the bed of the truck, in the preferred embodiment the left camper rail is defined by a left front camper rail member and a left rear camper rail member; and the right camper rail is defined by a right front camper rail member and a right rear camper rail member. The camper rail members are further adapted to be received by and engage the bed-mounted rail-receiver track assembly. The bed-mounted rail-receiver track assembly includes at least two and preferably four bed-mounted rail-receiver track members. Preferably, the bed-mounted rail-receiver track assembly includes a right front bed-mounted rail-receiver track member, a right rear bed-mounted rail-receiver track member, a left front bed-mounted rail-receiver track member, and a left rear bed-mounted rail-receiver track member. Those skilled in the art will recognize that a bed-mounted rail-receiver track assembly that included only two bed-mounted rail-receiver track members, mounted in diagonal relationship, i.e. a right front bed-mounted rail-receiver track member and a left rear bed-mounted rail-receiver track member, would secure the camper so as to limit bounce, but a rail-receiver track assembly having four bed-mounted rail members is preferred.

Each bed-mounted rail-receiver track member is carried by a bed-mounted rail-receiver track plate and includes a flange. The flange is flared so as to compensate for slight misalignments either up or side to side. In the preferred embodiment, and to facilitate alignment of the front and rear bed-mounted rail-receiver track members, the front and rear bed-mounted rail-receiver track members are carried by a bed-mounted bar. It will be appreciated that the plates can be bolted to the bed-mounted bar, or, preferably, machined or otherwise fabricated to be integral with the bed-mounted bar. In an alternate embodiment, the bed-mounted rail-receiver track plates are mounted directly to the bed of the truck.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1A:
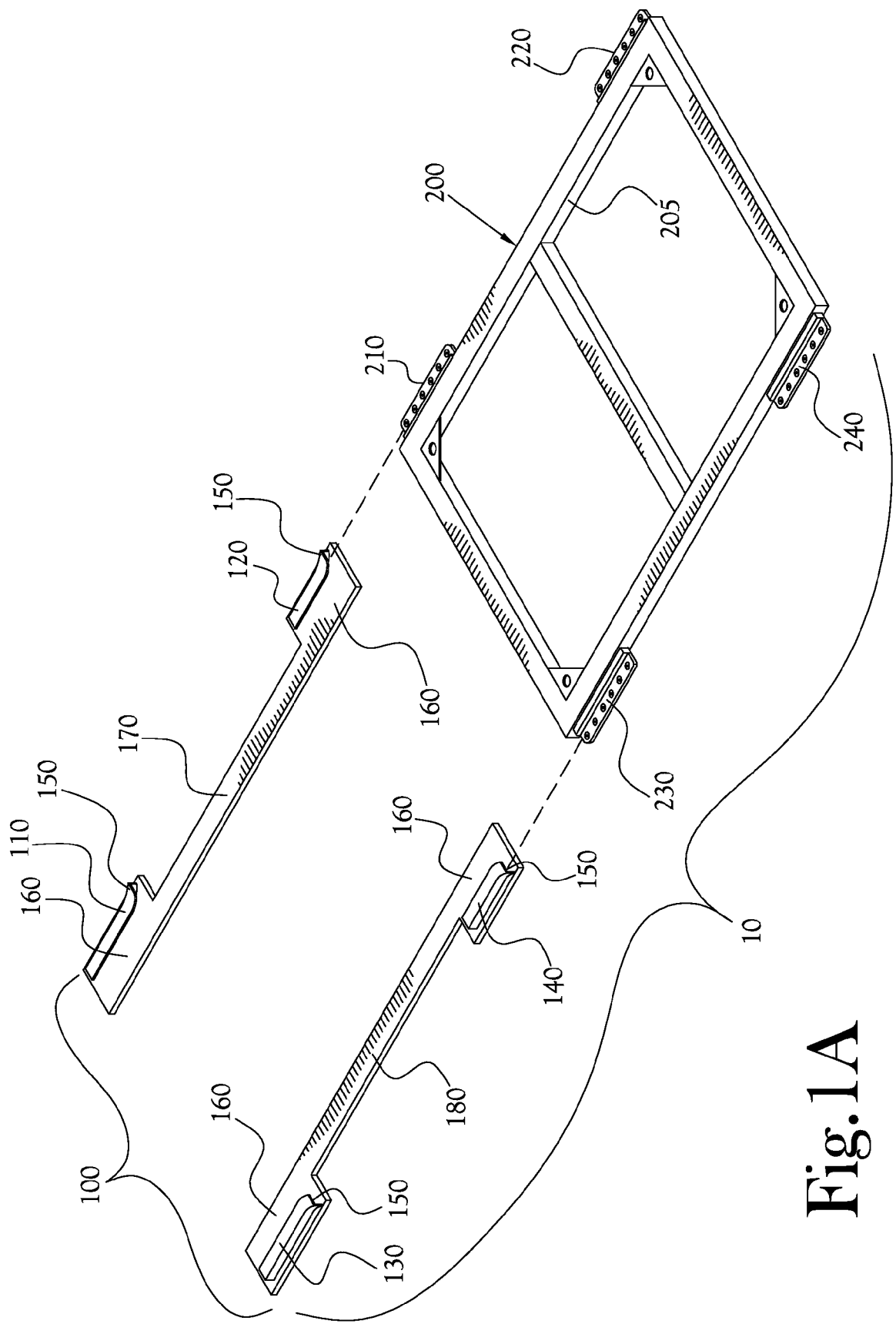
FIG. 1A is an exploded perspective view of the preferred embodiment of the latch system for a truck-bed mounted camper of the present invention showing just the rail-receiver track assembly and the camper rail assembly, in exploded view. For clarity of view, the truck and the camper are not illustrated in this view.

According to one embodiment of the present invention, a latch system for a truck-bed mounted camper is provided. It will be appreciated by those skilled in the art, that typical bed-mounted campers, such as camper 30 incorporate a lower region adapted to be received within the confines of a bed 40 of a truck 50 and, thus, has a width adapted to be received within the width between the wheel wells; additionally, the camper 30 has an upper region that is often wider than, and thus may overhang, and extends above the side walls of the bed 40 of truck 50. In order to secure the bed-mounted camper 30 within the bed of the truck and prevent bouncing of the camper within the bed of the truck during transport, a latch system 10 for a bed-mounted camper is provided. The latch system 10 comprises two main assemblies: the bed-mounted rail-receiver track assembly 100 and the camper rail frame assembly 200 which is adapted to be secured to the bottom of the camper 30, i.e. the portion that engages and is supported by the floor 45 of the bed 40 of the truck 50.

The bed-mounted rail-receiver track assembly 100 includes at least two, and preferably four, bed-mounted rail-receiver track members. Preferably, the bed-mounted rail-receiver track assembly includes a right front bed-mounted rail-receiver track member 110, a right rear bed-mounted rail-receiver track member 120, a left front bed-mounted rail-receiver track member 130, and a left rear bed-mounted rail-receiver track member 140. Those skilled in the art will recognize that a bed-mounted rail-receiver track assembly 100 that included only two bed-mounted rail-receiver track members, either centrally mounted on each side or mounted in diagonal relationship, i.e. a right front bed-mounted rail-receiver track member and a left rear bed-mounted rail-receiver track member, would secure the camper so as to limit bounce, but an assembly having four bed-mounted rail-receiver track members is preferred, and provides better alignment of the camper with the bed of the truck. Each of the bed-mounted rail-receiver track members 110, 120, 130, and 140 includes a flange 150 and is carried by bed-mounted rail-receiver track plate 160. The flange 150 is flared, preferably in both the horizontal and vertical axis so as to compensate for slight misalignments either up or side to side.

Figure 1B:
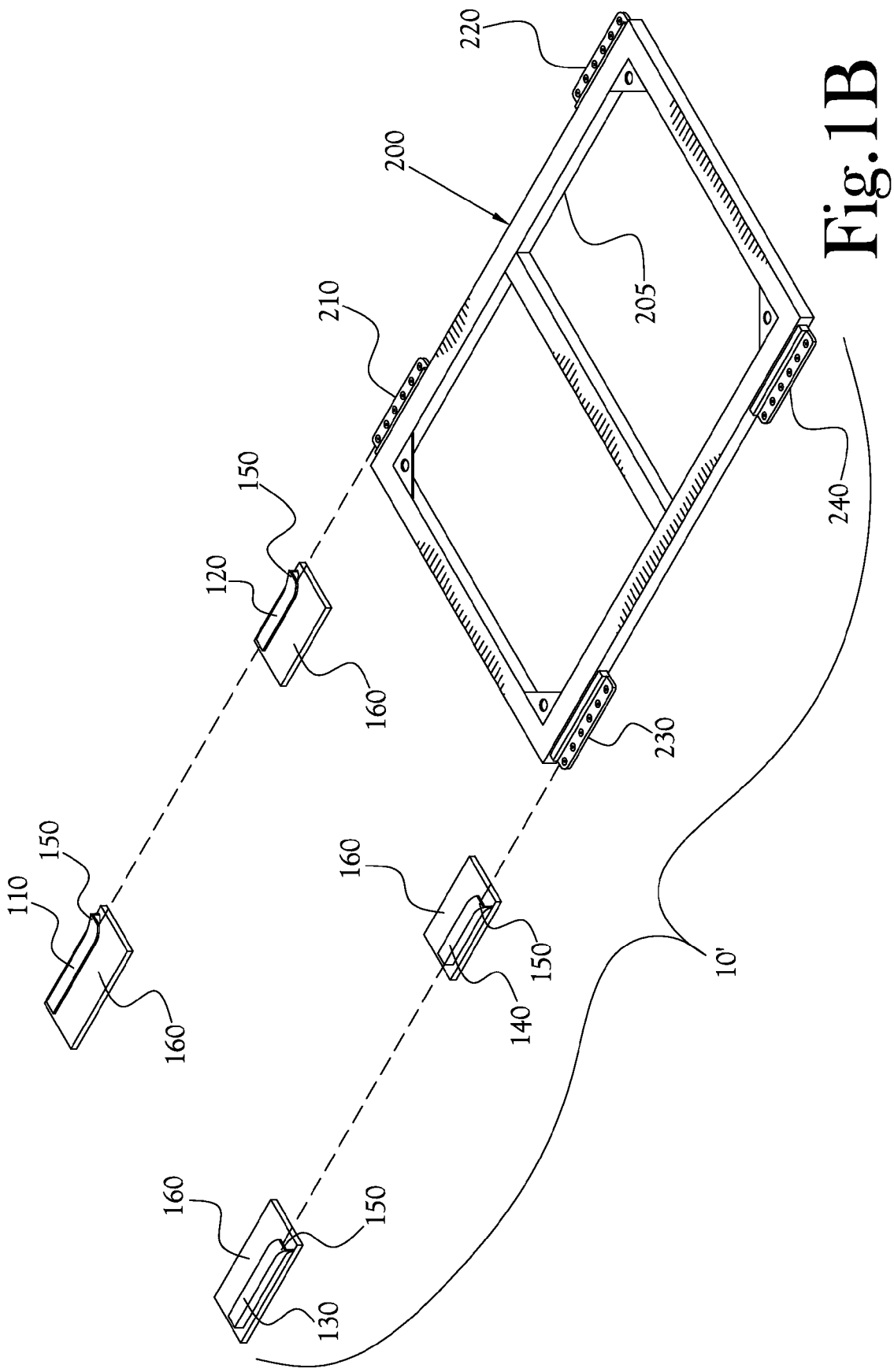
FIG. 1B is a partially exploded perspective view of the latch system for a truck-bed mounted camper of the present invention showing individual rail-receiver track members without the right and left track bars and the camper rail assembly, in exploded view. For clarity of view, the truck and the camper are not illustrated in this view.
Figure 2:
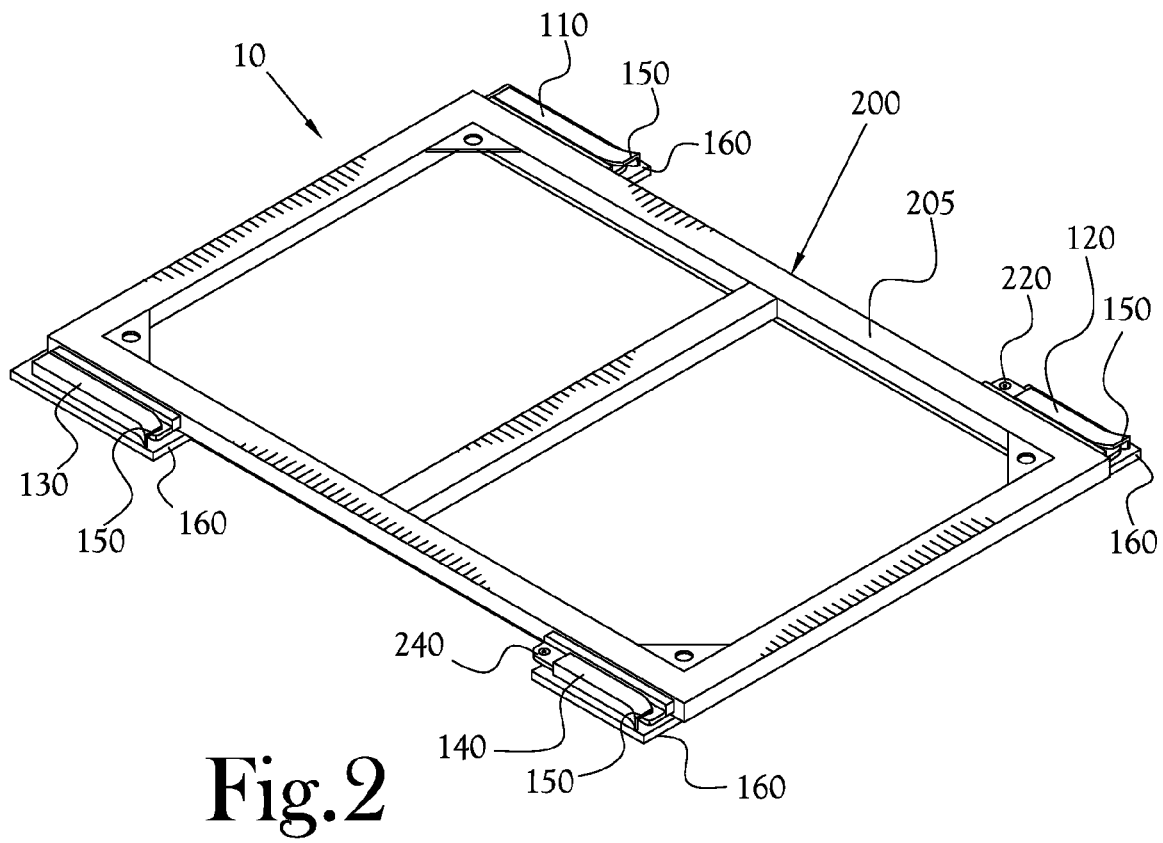
FIG. 2 is a perspective view of the latch system for a truck-bed mounted camper of the present invention showing the rail-receiver track assembly receiving and engaged with the camper rail assembly. For clarity of view, the truck and the camper are not illustrated in this view.
Figure 3:
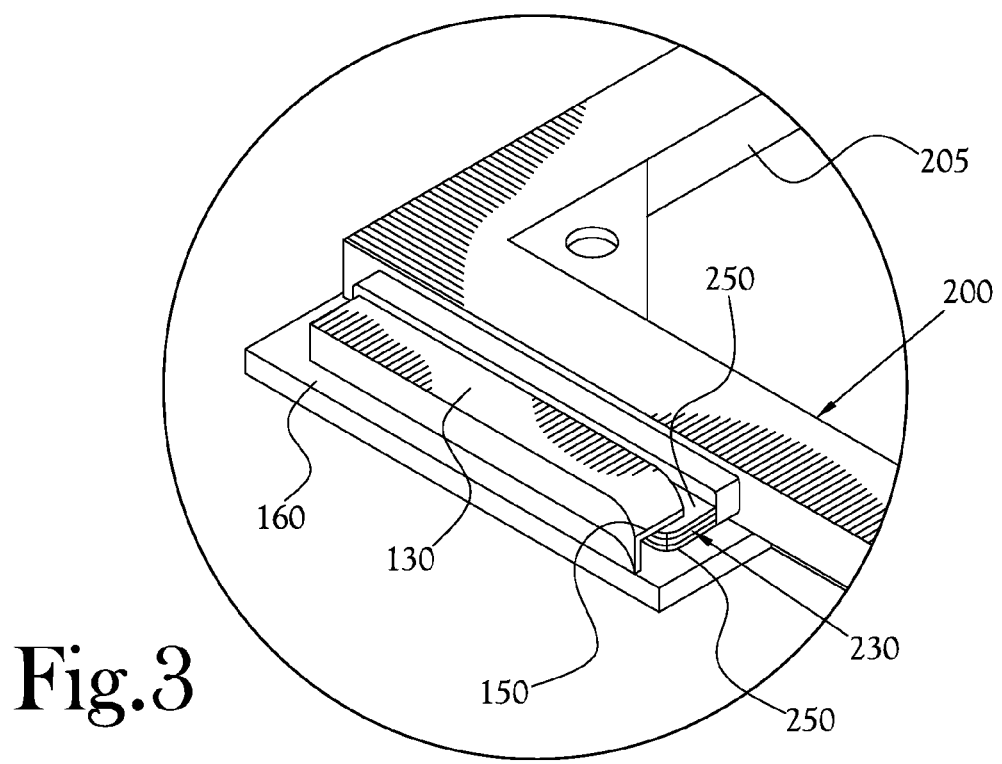
FIG. 3 is a close-up perspective view of the right front rail member received by and engaged with the right front rail-receiver track member. For clarity of view, the truck and the camper are not illustrated in this view.
Figure 4:
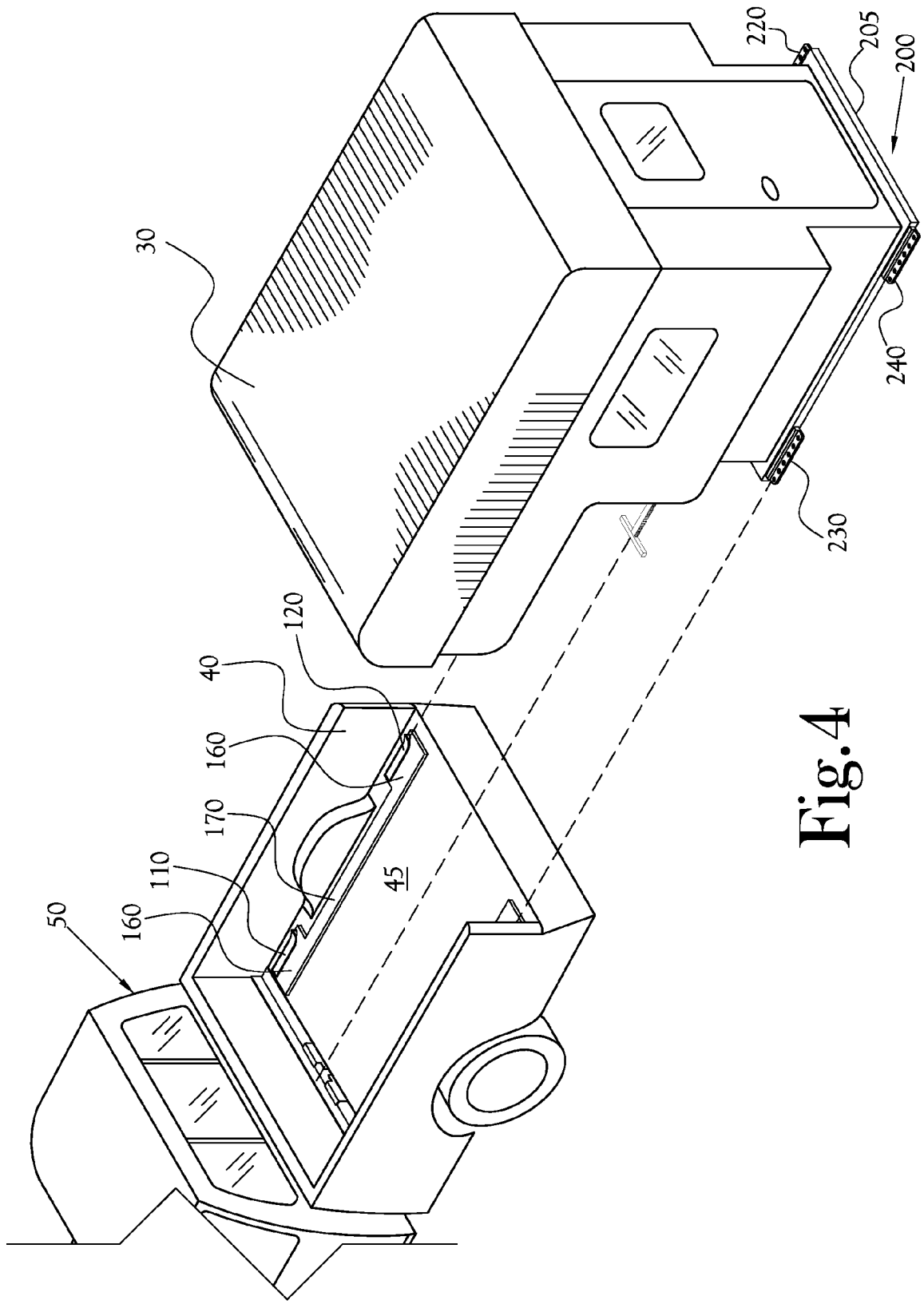
FIG. 4 is a partially exploded perspective view of the preferred embodiment of the latch system for securing a camper in the bed of a truck of the present invention as illustrated in FIG. 1A showing the invention in the context of the environment of the truck bed and the camper.

In the preferred embodiment, and to facilitate alignment of the front and rear bed-mounted rail-receiver tracks, the right bed-mounted rail-receiver tracks, 110 and 120 are carried by a right bed-mounted track bar 170, and left bed-mounted rail-receiver tracks, 130 and 140, are carried by a left bed-mounted track bar 180. It will be appreciated that the plates can be bolted to the respective bed-mounted track bars, or, preferably, can be machined or otherwise fabricated to be integral with the bed-mounted track bars 170 and 180, i.e. cut from a common blank. It will be understood, as illustrated in FIG. 1B, that in an alternate embodiment latch system 10' the right and left bed-mounted track bars 170 and 180 can be omitted and the bed-mounted rail-receiver track plates 160 can be mounted directly to the bed 40 of the truck 50.

The camper rail frame assembly 200 includes a frame member 205 which is adapted to be mounted on the bottom of camper 30. Further, camper rail frame assembly 200 includes at least two and, and preferably, four protruding camper rail members adapted to be received by the bed-mounted rail receivers. In this regard, camper rail frame assembly 200 includes a right front camper rail member 210, a right rear camper rail member 220, a left front camper rail member 230, and a left rear camper rail member 240. The camper rail members 210, 220, 230, and 240 are disposed proximate the respective corners of frame member 205 and are adapted to be received by the respective bed-mounted rail-receiver track members 110, 120, 130, and 140. In the preferred embodiment, the camper rail members 210, 220, 230, and 240 are provided with neoprene inserts 250 in order to prevent metal-to-metal contact when the camper rails are engaged with their respective bed-mounted rail-receiver track members.

Figure 5:
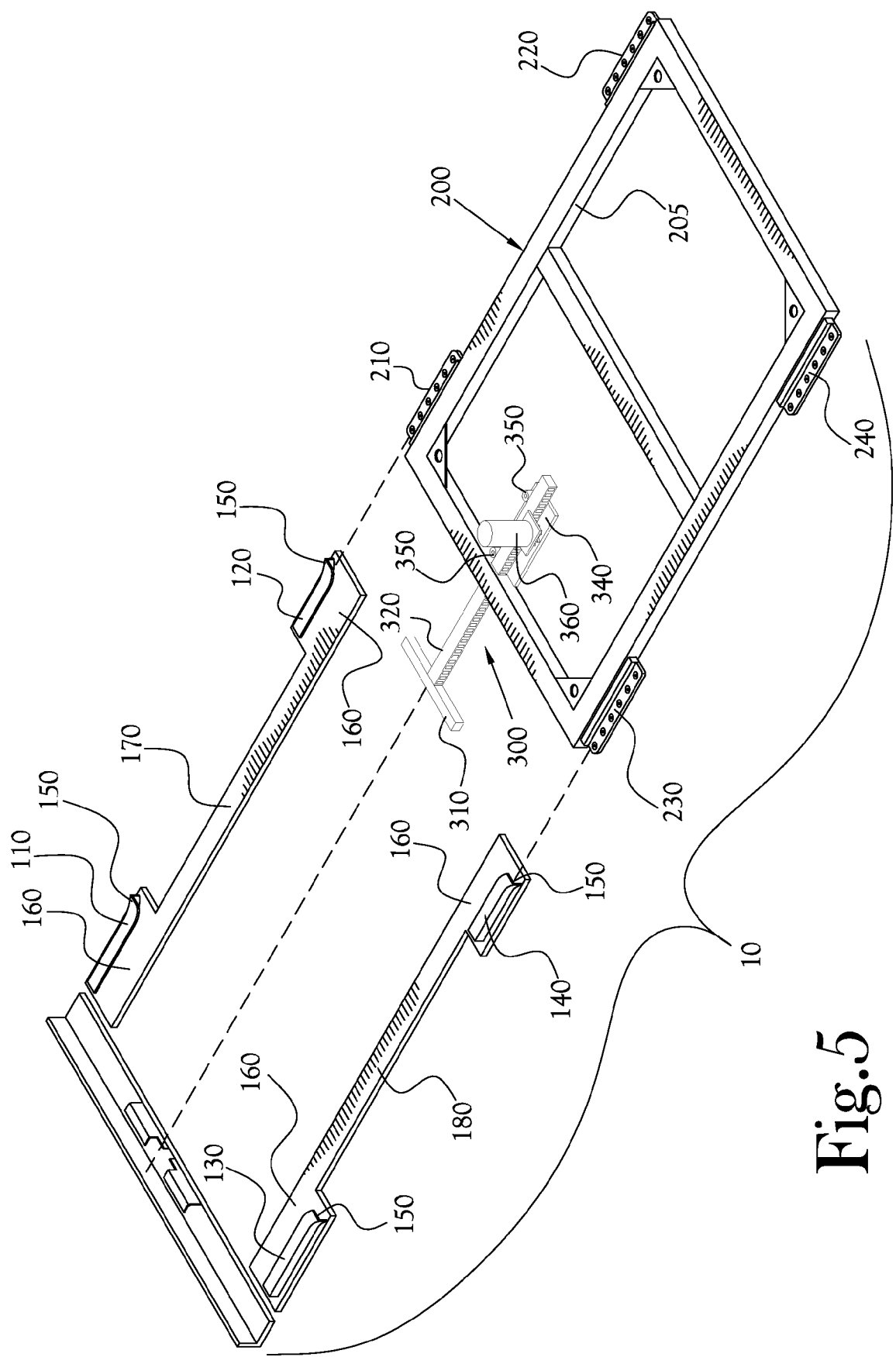
FIG. 5 is a partially exploded perspective view of the latch system of the present invention illustrated in FIG. 1 showing the load assisting T-bar assembly. For clarity of view, the truck and the camper are not illustrated in this view.
Figure 6:
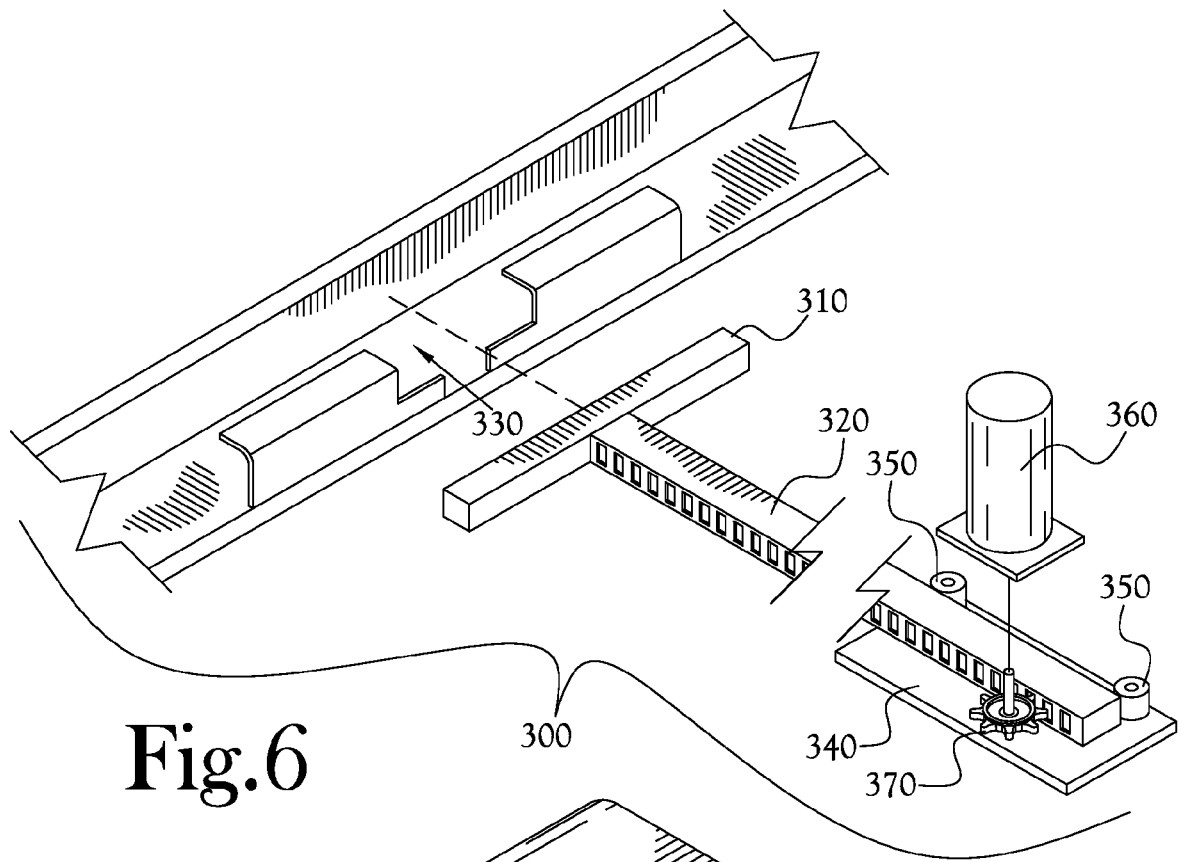
FIG. 6 is a close-up perspective of the load assisting T-bar assembly.
Figure 7:
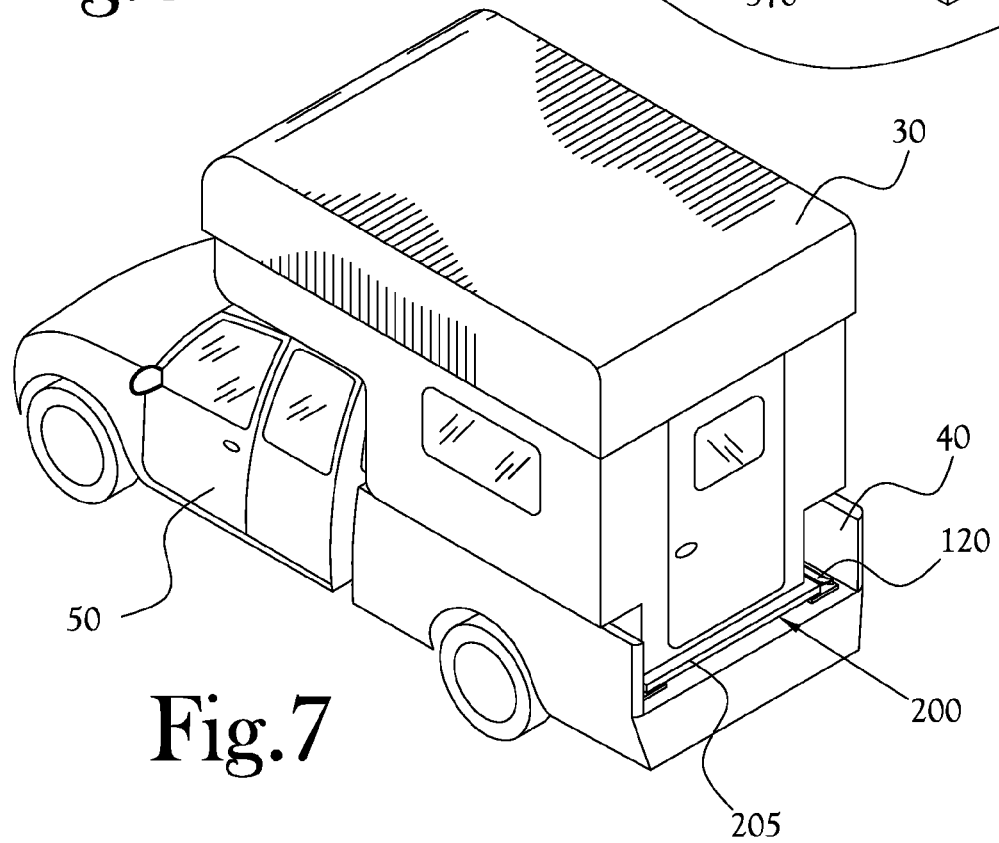
FIG. 7 is a perspective view of a camper mounted in a truck bed.

As illustrated in FIGS. 5 and 6, the latch system 10 of the present invention can include a load assist T-bar assembly 300. The load assist T-bar assembly 300 is centrally mounted at the forward end of the camper rail frame assembly 200. The load assist T-bar assembly 300 includes a T-bar 310 carried by a T-bar shaft 320. A T-bar receiver bracket 330 is mounted in the forward end of the bed 40 of the truck 50. A guide plate 340 having at least one, and preferably two, bushings 350 keeps the T-bar shaft 320 on track. In the preferred embodiment the T-bar shaft 320 defines a rack gear and a motor 360 drives a pinion gear 370 which engages the rack gear defining T-bar shaft 320 for selectively extending or retracting the T-bar shaft 320 and its associated T-bar 310. It will be appreciated by those skilled in the art, that while the T-bar shaft 320 is illustrated and described as a rack and pinion type of gear relationship, other gear mechanisms, or even hydraulic mechanisms (not shown) could be utilized to selectively extend and retract the T-bar shaft 320 and its associated T-bar 310. The motor 360, as will be appreciated by those skilled in the art, can be mounted on the inside of the camper 30, preferably within a utility cabinet (not shown) so as to be out of the way. Further, the motor 360 could be selectively actuated to affect the extension or retraction of the T-bar shaft 320. In this regard, in the preferred embodiment, dual momentary switches (not shown) could be utilized which would be simultaneously depressed to activate the motor 360. The use of dual momentary switches would reduce the risk of inadvertent activation of motor 360. Further, it will be appreciated that the switch mechanism for activating motor 360 could be in wired or wireless communication with motor 360.

It will be understood by those skilled in the art, that when the camper 30 is not installed in the bed 40 of the truck 50, it is supported by jack stands (not shown). In order to install the camper 30 in the truck 50, the camper is raised on jack stands to a height adequate for the camper rail members 210, 220, 230, and 240 to clear the top of the bed-mounted rail-receiver track members 110, 120, 130, and 140. The truck 50 is then aligned with the camper 30 and backed up to a point where the front camper rail members 210 and 230 clear the rear bed-mounted rail-receiver tracks and the fully extended T-bar 310 aligns with the T-bar receiver bracket 330. The camper 30 is then lowered such that the camper rails are in substantial alignment with the bed-mounted rail-receiver tracks. Motor 360 is then activated to retract T-bar shaft 320 thereby pulling the camper 30 into the bed 40 of the truck 50. As the camper 30 with the camper rail frame member 200 mounted thereon is slid into the bed of the truck, the front camper rail members 210 and 230 engage the front bed-mounted rail receiver members 110 and 130 while the rear camper rail members 220 and 240 engage the rear bed-mounted rail receiver members 120 and 140. The flanges 150 on the bed-mounted rail receiver members, as mentioned above, compensate for slight deviations in alignment and bring the camper 30 in alignment with the bed 40 of the truck 50. As the camper continues to be moved into the bed, the camper rail members 210, 220, 230, and 240, which are dimensioned to be tightly, yet slidably received by the bed-mounted rail receiver members 110, 120, 130, and 140, will engage the bed-mounted rail-receiver members in a tight, frictional fit, thereby securing the camper in the bed of the truck so as to substantially prevent the camper 30 from bouncing during transport. It will be appreciated that the engagement of the T-bar 310 with the T-bar receiver bracket 330 substantially prevents the camper 30 from sliding out of the bed 40 of the truck 50 during transport. For additional security, if desired, an additional mechanical latch (not shown) can be mounted towards the rear of the frame member 205 for further securing the frame member 205 to a hard point (not shown) in the bed 40 of the truck 50.

It will be appreciated that to remove the camper 30 from the bed 40 of the truck 50, the process is reversed. In this regard, the motor 360 is selectively engaged so as to extend the T-bar shaft 320, and its associated T-bar 310, thereby pushing the camper 30 towards the rear of the bed 40. As the camper 30 with the camper rail frame member 200 mounted thereon is pushed towards the rear of the bed 40 of the truck 50, the front camper rail members 210 and 230 disengage from the front bed-mounted rail receiver members 110 and 130 while the rear camper rail members 220 and 240 disengage from the rear bed-mounted rail receiver members 120 and 140. The camper 30 is then raised on jack stands to a height adequate for the camper rail members 210, 220, 230, and 240 to clear the top of the bed-mounted rail-receiver track members 110, 120, 130, and 140; and the truck 50 is then driven out from under the camper 30.

From the foregoing description, it will be recognized by those skilled in the art that a latch system for a truck-bed mounted camper has been provided. The latch system secures the truck-bed mounted camper within the bed of the truck so as to prevent the camper from bouncing within the bed during transport.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A latch system for securing a camper within the bed of a truck, said latch system comprising:
    a camper rail frame assembly adapted to be secured to a bottom of the camper, said camper rail frame assembly including at least one rail member carried by a first side of said camper rail frame assembly, and at least one rail member carried by a second side of said camper rail frame assembly;
    a bed-mounted rail-receiver track assembly defining at least a first bed-mounted rail-receiver track member for receiving and engaging said at least one rail member carried by said first side of said camper rail frame and at least a second bed-mounted rail-receiver track member for receiving and engaging said at least one rail member carried by said second side of said camper rail frame member, whereby upon engagement of said rail members carried by said camper rail frame member with said first and said second bed-mounted rail-receiver track members, the camper is prevented from bouncing within the truck bed during transport.

2. The latch system of claim 1 wherein said camper rail frame assembly further includes a camper rail frame member adapted to be secured to the bottom of the camper and further wherein said rail members are carried by said camper rail frame member.

3. The latch system of claim 1 wherein said bed-mounted rail-receiver track assembly includes a right front bed-mounted rail-receiver track member and a right rear bed-mounted rail-receiver track member adapted for receiving said at least one rail member carried by said first side of said camper rail frame member, and further includes a left front bed-mounted rail-receiver track member and a left rear bed-mounted rail-receiver track member adapted for receiving said at least one rail member carried by said second side of said camper rail frame member.

4. The latch system of claim 3 wherein said camper rail frame assembly includes a right front camper rail member adapted to be received by said right front bed-mounted rail-receiver track member, a right rear camper rail member adapted to be received by said right rear bed-mounted rail-receiver track member, a left front camper rail member adapted to be received by said left front bed-mounted rail-receiver track member, and a left rear camper rail member adapted to be received by said left rear bed-mounted rail-receiver track member.

5. The latch system of claim 1 wherein said bed-mounted rail-receiver track members include at least one flange adapted to compensate for slight misalignments either up or side to side as said camper rail members are being aligned with said bed-mounted rail-receiver track members.

6. The latch system of claim 5 wherein said bed-mounted rail-receiver track members include at least one flange which is flared in both a horizontal and a vertical axis so as to compensate for slight misalignments either up or side to side as said camper rail members are being aligned with said bed-mounted rail-receiver track members.

7. The latch system of claim 1 wherein said latch system further comprising a load assist T-bar assembly centrally mounted at a forward end of said camper rail frame assembly, said load assist T-bar assembly including a T-bar shaft, a T-bar carried by said T-bar shaft, a T-bar receiver bracket adapted to be mounted in a forward end of the bed of the truck for receiving said T-bar when the camper is mounted in the bed of the truck thereby substantially securing the camper within the bed of the truck.

8. The latch system of claim 7 wherein said T-bar shaft is selectively extendable and retractable whereby said load assist T-bar assembly assists in loading and unloading the camper from the bed of the truck, and further wherein said load assist T-bar assembly further comprises a selectively energizable motor in operative communication with said T-bar shaft for selectively extending and retracting said T-bar shaft.

9. The latch system of claim 8 wherein said T-bar shaft defines a rack gear and further wherein said selectively energizable motor includes a pinion gear for engaging said T-bar shaft.

10. A latch system for securing a camper within the bed of a truck, said latch system comprising:
  a camper rail frame assembly adapted to be secured to a bottom of the camper, said camper rail frame assembly including a camper rail frame member adapted to be secured to the bottom of the camper, wherein said camper rail frame assembly further includes a right front camper rail member adapted to be received by said right front bed-mounted rail-receiver track member, a right rear camper rail member adapted to be received b said right rear bed-mounted rail-receiver track member, a left front camper rail member adapted to be received by said left front bed-mounted rail-receiver track member, and a left rear camper rail member adapted to be received by said left rear bed-mounted rail-receiver track member;
  a bed-mounted rail-receiver track assembly defining at least a first bed-mounted rail-receiver track member for receiving and engaging said at least one rail member carried by said first side of said camper rail frame and at least a second bed-mounted rail-receiver track member for receiving and engaging said at least one rail member carried by said second side of said camper rail frame member, whereby upon engagement of said rail members carried by said camper rail frame member with said first and said second bed-mounted rail-receiver track members, the camper is prevented from bouncing within the truck bed during transport.

11. The latch system of claim 10 wherein said at least one bed-mounted rail-receiver track member includes at least one flange adapted to compensate for slight misalignments either up or side to side as said camper rail members are being aligned with said bed-mounted rail-receiver track members.

12. The latch system of claim 11 wherein said at least one flange is flared in both a horizontal and a vertical axis so as to compensate for slight misalignments either up or side to side as said at least one camper rail member is being aligned with said at least one bed-mounted rail-receiver track member.

13. The latch system of claim 10 wherein said latch system further comprising a load assist T-bar assembly centrally mounted at a forward end of said camper rail frame assembly, said load assist T-bar assembly including a T-bar shaft, a T-bar carried by said T-bar shaft, a T-bar receiver bracket adapted to be mounted in a forward end of the bed of the truck for receiving said T-bar when the camper is mounted in the bed of the truck thereby substantially securing the camper within the bed of the truck.

14. The latch system of claim 13 wherein said T-bar shaft is selectively extendable and retractable whereby said load assist T-bar assembly assists in loading and unloading the camper from the bed of the truck, and further wherein said load assist T-bar assembly further comprises a selectively energizable motor in operative communication with said T-bar shaft for selectively extending and retracting said T-bar shaft.

15. The latch system of claim 14 wherein said T-bar shaft defines a rack gear and further wherein said selectively energizable motor includes a pinion gear for engaging said T-bar shaft.

16. A latch system for securing a camper within the bed of a truck, said latch system comprising:
  a camber rail frame assemembly adapted to be secured to a bottom of the camper, said camper rail frame assembly including at least one rail member carried by a first side of said camper rail frame assembly, and at least one rail member carried by a second side of said camper rail frame assembly;
  a bed-mounted rail-receiver track assembly defining at least a first bed-mounted rail-receiver track member for receiving and engaging said at least one rail member carried by said first side of said camper rail frame and at least a second bed-mounted rail-receiver track member for receiving and engaging said at least one rail member carried by said second side of said camper rail frame member, whereby upon engagement of said rail members carried by said camper rail frame member with said first and said second bed-mounted rail-receiver track members, the camper is prevented from bouncing within the truck bed during transport;
  wherein said camper rail frame assembly further includes a right front camper rail member adapted to be received by said right front bed-mounted rail-receiver track member, a right rear camper rail member adapted to be received by said right rear bed-mounted rail-receiver track member, a left front camper rail member adapted to be received by said left front bed-mounted rail-receiver track member, and a left rear camper rail member adapted to be received by said left rear bed-mounted rail-receiver track member; and
  a load assist T-bar assembly centrally mounted at a forward end of said camper rail frame assembly, said load assist T-bar assembly including a T-bar shaft, a T-bar carried by said T-bar shaft, a T-bar receiver bracket adapted to be mounted in a forward end of the bed of the truck for receiving said T-bar when the camper is mounted in the bed of the truck thereby substantially securing the camper within the bed of the truck.

17. The latch system of claim 16 wherein said bed-mounted rail-receiver track members include at least one flange adapted to compensate for slight misalignments either up or side to side as said camper rail members are being aligned with said bed-mounted rail-receiver track members.

18. The latch system of claim 16 wherein said at least one flange is flared in both a horizontal and a vertical axis so as to compensate for slight misalignments either up or side to side as said camper rail members are being aligned with said bed-mounted rail-receiver track members.

19. The latch system of claim 16 wherein said T-bar shaft is selectively extendable and retractable whereby said load assist T-bar assembly assists in loading and unloading the camper from the bed of the truck, and further wherein said load assist T-bar assembly further comprises a selectively energizable motor in operative communication with said T-bar shaft for selectively extending and retracting said T-bar shaft.

20. The latch system of claim 16 wherein said T-bar shaft defines a rack gear and further wherein said selectively energizable motor includes a pinion gear for engaging said T-bar shaft.

* * * * *